United States Patent
Miyazaki

(10) Patent No.: US 7,734,141 B2
(45) Date of Patent: Jun. 8, 2010

(54) VIDEO RECORDING APPARATUS AND VIDEO PRINTING APPARATUS

(75) Inventor: Takao Miyazaki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1244 days.

(21) Appl. No.: 11/258,069

(22) Filed: Oct. 26, 2005

(65) Prior Publication Data
US 2006/0115236 A1 Jun. 1, 2006

(30) Foreign Application Priority Data
Nov. 29, 2004 (JP) .............................. 2004-344554

(51) Int. Cl.
H04N 7/00 (2006.01)
H04N 5/93 (2006.01)
(52) U.S. Cl. .......................................... 386/46; 386/52
(58) Field of Classification Search .................. 386/46, 386/52, 107, 117, 124, 123
See application file for complete search history.

(56) References Cited

U.S. PATENT DOCUMENTS 5,487,140 A * 1/1996 Toya ........................... 345/641
7,440,638 B2 * 10/2008 Nagahashi et al. .......... 382/305

FOREIGN PATENT DOCUMENTS

| JP | 10-285528 A | 10/1998 |
|----|-------------|---------|
| JP | 2000-50192 A | 2/2000 |
| JP | 2001-285787 A | 10/2001 |
| JP | 2004-334836 A | 11/2004 |

OTHER PUBLICATIONS

Japanese Office Action issued in corresponding Japanese Application on Dec. 28, 2009 in JP Appl. No. 2004-344554.

* cited by examiner

*Primary Examiner*—Robert Chevalier
(74) *Attorney, Agent, or Firm*—Birch, Stewart, Kolasch & Birch, LLP

(57) ABSTRACT

The present invention provides a video recording apparatus comprising a video inputting device for inputting a video, a video storing device for storing a video inputted by the video inputting device, a keyword inputting device for inputting a keyword, a key image generating device for generating a key image for a keyword inputted by the keyword inputting device, a key image detecting device for detecting a frame containing a key image generated by the key image generating device in a video inputted by the video inputting device, and a video deleting device for deleting a video stored in the video storing device when no frame containing a key image is detected by the key image detecting device.

6 Claims, 12 Drawing Sheets

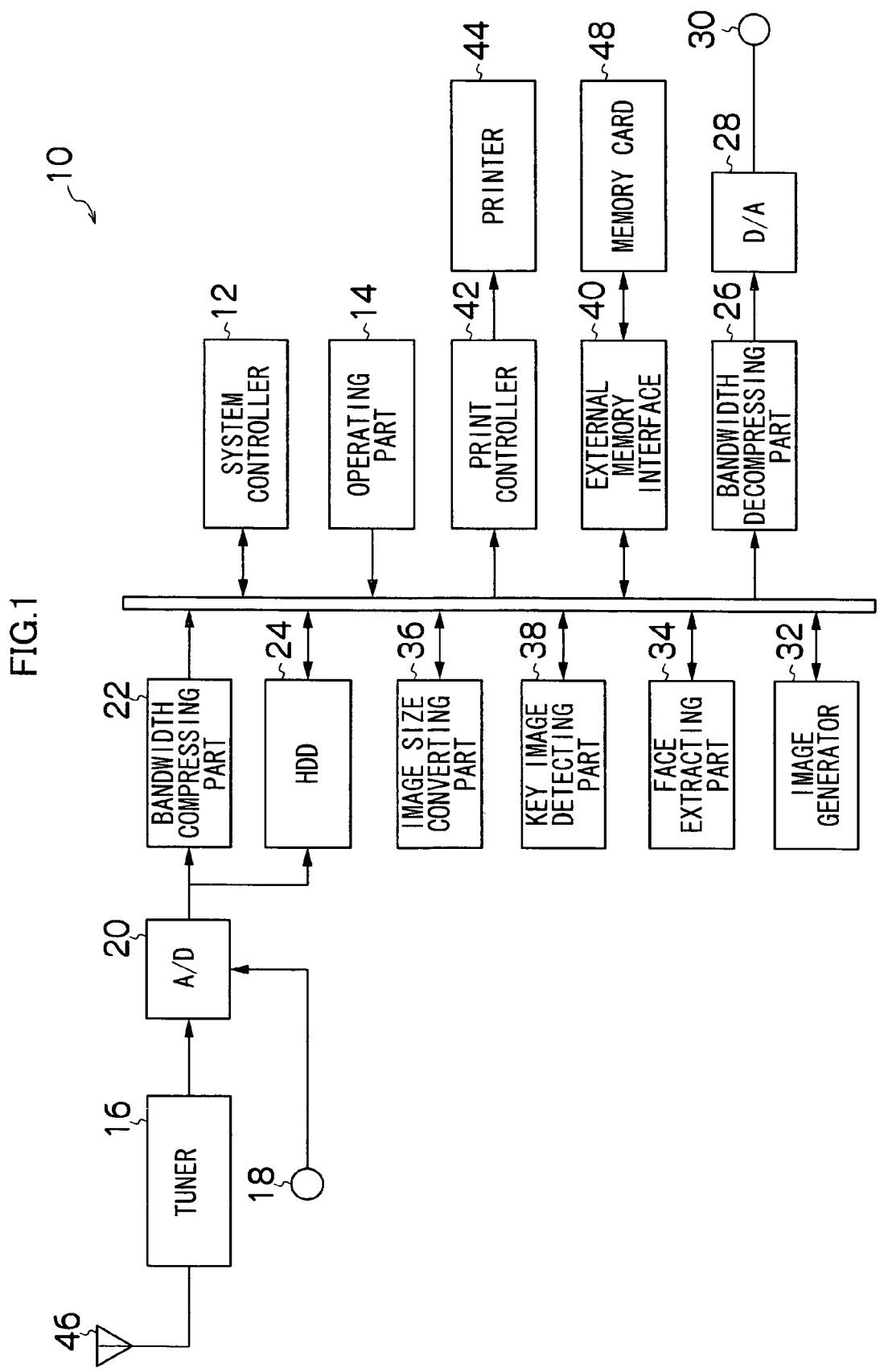

INPUT KEY IMAGE

SEARCH

INPUT KEY IMAGE

EXTRACT FACE

SEARCH

VIDEO RECORDING APPARATUS AND VIDEO PRINTING APPARATUS

BACKGROUND OF THE INVENTION

1. Field of the Invention

The present invention relates to a video recording apparatus and a video printing apparatus, and more specifically to a video recording apparatus and a video printing apparatus to automatically record and print a video displaying a particular image.

2. Description of the Related Art

When a user wants to record a television program by a VCR, the user usually checks TV listings on a newspaper or a magazine, selects a program to record and sets the recorder to record the program. This method has a problem in that a user cannot watch a program when the user fails to set the recorder to record the program.

In order to eliminate such a problem, a method of recording all the television programs on a large capacity of recording medium has been proposed. This method, however, has a problem in that a user has a trouble in finding a desired program from all the recorded programs.

Japanese Patent Application Laid-Open No. 10-285528 proposes a method of recording a desired program by using transmitted character information, which is superimposed on television signals.

SUMMARY OF THE INVENTION

The method proposed in Japanese Patent Application Laid-Open No. 10-285528 has a problem in that it cannot apply to recording of a television program or a video other than a television program without character information superimposed on it, because the method can only apply to recording of a television program with character information superimposed on it.

The present invention is adapted in view of the above circumstances, and intends to provide a video recording apparatus and a video printing apparatus, which can automatically record and print a video displaying a particular image.

In order to achieve the above intention, a first aspect of the invention provides a video recording apparatus comprising: a video inputting device for inputting a video; a video storing device for storing a video inputted by the video inputting device; a keyword inputting device for inputting a keyword; a key image generating device for generating a key image for a keyword inputted by the keyword inputting device; a key image detecting device for detecting a frame containing a key image generated by the key image generating device in a video inputted by the video inputting device; and a video deleting device for deleting a video stored in the video storing device when no frame containing a key image is detected by the key image detecting device.

According to the present invention, when a keyword is inputted, a key image for the keyword is generated by a key image generating device and a frame containing the generated key image is detected in a video inputted by a video inputting device. When a frame containing the key image is detected, the video inputted by the video inputting device is kept in a video storing device as it is. When no frame containing the key image is detected, the video inputted by the video inputting device is deleted from the video storing device.

In order to achieve the above intention, a second aspect of the invention provides a video recording apparatus comprising: a video inputting device for inputting a video; a video storing device for storing a video inputted by the video inputting device; a key image inputting device for inputting a key image; a key image detecting device for detecting a frame containing a key image inputted by the key image inputting device in a video inputted by the video inputting device; and a video deleting device for deleting a video stored in the video storing device when no frame containing a key image is detected by the key image detecting device.

According to the present invention, when a key image is inputted, a frame containing the inputted key image is detected in a video inputted by a video inputting device. When a frame containing the inputted key image is detected, the video inputted by the video inputting device is kept in a video storing device as it is. When no frame containing the key image is detected, the video inputted by the video inputting device is deleted from the video storing device.

In order to achieve the above intention, a third aspect of the invention provides a video recording apparatus comprising: a video inputting device for inputting a video; a video storing device for storing a video inputted by the video inputting device; a portrait inputting device for inputting a portrait; a key image extracting device for extracting a person's face image as a key image from the portrait inputted by the portrait inputting device; a key image detecting device for detecting a frame containing a key image extracted by the key image extracting device in a video inputted by the video inputting device; and a video deleting device for deleting a video stored in the video storing device when no frame containing a key image is detected by the key image detecting device.

According to the present invention, when a portrait is inputted, a person's face image is extracted from the inputted portrait as a key image, and a frame containing the extracted key image is detected in a video inputted by a video inputting device. When a frame containing the key image is detected, a video inputted by a video inputting device is kept in a video storing device as it is. When no frame containing the key image is detected, the video inputted by the video inputting device is deleted from the video storing device.

In order to achieve the above intention, a fourth aspect of the invention provides the video recording apparatus according to the first, second, or third aspect of the invention, comprising a size changing device for changing a size of the key image in stages; wherein the key image detecting device detects a frame containing a key image in a video inputted by the video inputting device for a key image in each size changed in stages by the size changing device.

According to the present invention, a fame containing a key image is detected by changing a size of the key image in stages. With this invention, a frame containing a key image can be detected more accurately.

In order to achieve the above intention, a fifth aspect of the invention provides the video recording apparatus according to the first, second, third or fourth aspect of the invention comprising a printing device for printing a frame of the video inputted by the video inputting device on a sheet of photographic paper, and a print control device for causing the printing device to print the frame detected by the key image detecting device.

According to the present invention, when a frame containing a key image is detected, the frame can be automatically printed on a sheet of photographic paper.

In order to achieve the above intention, a sixth aspect of the invention provides a video printing apparatus comprising: a video inputting device for inputting a video; a printing device for printing a frame of a video inputted by the video inputting device on a sheet of photographic paper; a keyword inputting device for inputting a keyword; a key image generating device for generating a key image for a keyword inputted by the keyword inputting device; a key image detecting device for detecting a frame containing a key image generated by the key image generating device in a video inputted by the video inputting device; and a print control device for causing the printing device to print a frame detected by the key image detecting device.

According to the present invention, when a keyword is inputted, a key image for the keyword is generated by a key image generating device and a frame containing the generated key image is detected in a video inputted by a video inputting device. When a frame containing the key image is detected, the frame is printed on a sheet of photographic paper by a printing device.

In order to achieve the above intention, a seventh aspect of the invention provides a video printing apparatus comprising: a video inputting device for inputting a video; a printing device for printing a frame of a video inputted by the video inputting device on a sheet of photographic paper; a key image inputting device for inputting a key image; a key image detecting device for detecting a frame containing a key image inputted by the key image inputting device in a video inputted by the video inputting device; and a print control device for causing the printing device to print a frame detected by the key image detecting device.

According to the present invention, when a key image is inputted, a frame containing the inputted key image is detected in a video inputted by a video inputting device. When a frame containing the key image is detected, the frame is printed on a sheet of photographic paper by printing device.

In order to achieve the above intention, a eighth aspect of the invention provides a video printing apparatus comprising: a video inputting device for inputting a video; a printing device for printing a frame of a video inputted by the video inputting device on a sheet of photographic paper; a portrait inputting device for inputting a portrait; a key image extracting device for extracting a person's face image as a key image from the portrait inputted by the portrait inputting device; a key image detecting device for detecting a frame containing a key image extracted by the key image extracting device in a video inputted by the video inputting device; and a print control device for causing the printing device to print a frame detected by the key image detecting device.

According to the present invention, when a portrait is inputted, a person's face image is extracted from the inputted portrait as a key image, and a frame containing the extracted key image is detected in a video inputted by a video inputting device. When a frame containing the key image is detected, the frame is printed on a sheet of photographic paper by a printing device.

In order to achieve the above intention, a ninth aspect of the invention provides the video printing apparatus according to the sixth, seventh or eighth aspect of the invention, comprising a size changing device for changing a size of the key image in stages; wherein the key image detecting device detects a frame containing a key image from a video inputted by the video inputting device for a key image in each size changed in stages by the size changing device.

According to the present invention, a fame containing a key image is detected by changing the size of a key image in stages. With this invention, a frame containing a key image can be detected more accurately.

According to the present invention, a video containing a particular image is automatically recorded and the image of the frame is automatically printed on a sheet of photographic paper.

BRIEF DESCRIPTION OF THE DRAWINGS

FIG. 1 is a block diagram showing an electronic configuration of a video recording/playing apparatus applying the present invention;

DETAILED DESCRIPTION OF THE PREFERRED EMBODIMENTS

Figure 2A:
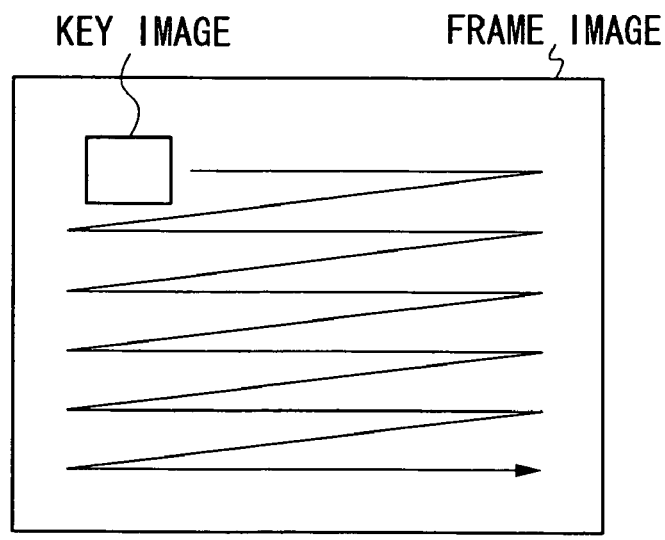
FIGS. 2A, 2B and 2C are schematic diagrams of a method of detecting a key image at a key image detecting part.

A preferred embodiment of a video recording apparatus and a video printing apparatus according to the present invention will be described in detail with reference to the appended figures.

FIG. 1 is a block diagram showing an electronic configuration of a video recording/playing apparatus 10 applying the present invention. The video recording/playing apparatus 10 has a printing function for printing a frame image of a video to be recorded/played on a sheet of photographic paper as well as a video recording/printing function. The video recording/playing apparatus 10 includes a system controller 12, an operating part 14, a tuner 16, a line input terminal 18, an A/D converter 20, a bandwidth compressing part 22, a hard disk apparatus (HDD) 24, a bandwidth decompressing part 26, a D/A converter 28, a line output terminal 30, an image generator 32, a face extracting part 34, an image size converting part 36, a key image detecting part 38, an external memory interface (I/F) 40, a print controller 42 and a printer 44.

The system controller 12 includes a CPU, ROM and RAM and controls over operations of the entire video recording/playing apparatus according to a predetermined control program.

The operating part 14 includes various buttons such as a record button, a replay button, a fast-forward button, a rewind button, a pause button and a channel setting button. The operating part 14 outputs signals in response to an operation to the system controller 12. The system controller 12 in turn controls respective parts of the video recording/playing apparatus 10 in response to a signal inputted from the operating part 14. As described later, a key word is inputted through the operating part 14.

The tuner 16 is connected with an antenna 46. Television signals received through the antenna 46 are inputted into the tuner 16. The tuner 16 converts the television signals inputted from the antenna 46 into video signals and outputs them to the A/D converter 20.

The line input terminal 18 is connected with external appliances including a video camera and a DVD player. Video signals played at the external appliances are inputted in the line input terminal 18 and added to the A/D converter 20.

The A/D converter 20 converts analog video signals inputted from the tuner 16 or the line input terminal 18 into digital video signals and outputs them to the bandwidth compressing part 22 and the HDD 24.

The bandwidth compressing part 22 performs encoding process such as MPEG (Moving Picture Experts Group) and JPEG (Joint Photographic coding Experts Group) on digitalized video signals under the control of the system controller 12. The encoded compressed video signals are recorded in the HDD 24 under the control of the system controller 12.

The compressed video signals recorded in the HDD 24 are read out from the HDD 24 in response to a playing command and added to the bandwidth decompressing part 26 under the control of the system controller 12.

The bandwidth decompressing part 26 performs decoding process such as MPEG and JPEG on the inputted compressed video signals under the control of the system controller 12. The decoded digital video signals are converted into analog video signals at the D/A converter 28 and outputted from the line output terminal 30.

The image generator 32 includes memory storing multiple key images. The key images are stored in the memory in association with respective keywords. The image generator 32 generates a key image according to a keyword in response to a command from the system controller 12.

The face extracting part 34 extracts a person's face region from inputted image data under the control of the system controller 12.

The image size converting part 36 converts a size of a key image under the control of the system controller 12.

The key image detecting part 38 tries to detect a frame containing a key image in each frame forming a video under the control of the system controller 12. Here, the key image detecting part 38 calculates a correlation value between each frame image forming the video and a key image and determines whether or not the calculated correlation value is a preset threshold or more to detect whether the key image is contained in each frame.

Figure 2B:
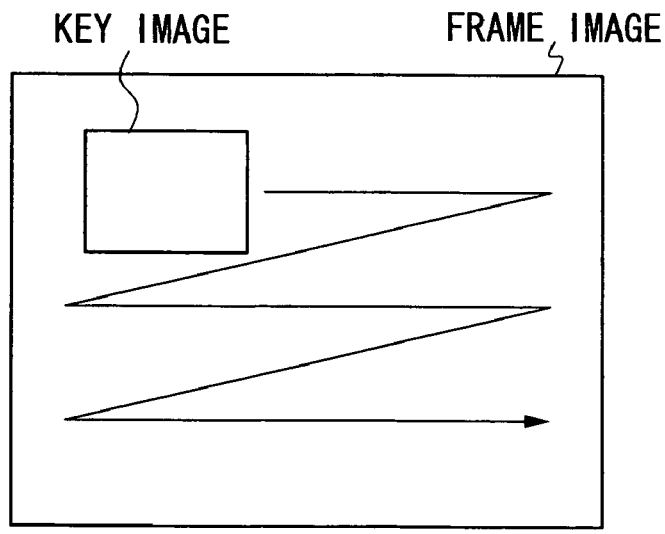
Figure 2C:
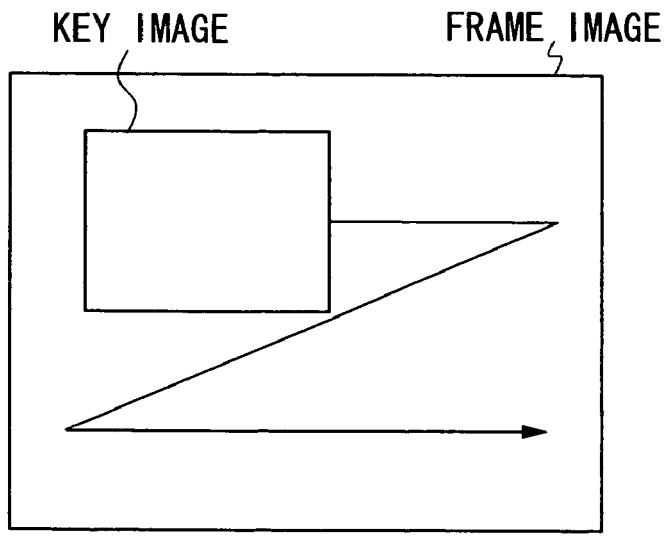

In other words, the key image detecting part 38 calculates a correlation between a coordinate of the key image and a local region in the frame image by inching the coordinate of the key image as shown in FIGS. 2A to 2C. If the obtained correlation is a preset threshold or more, the key image detecting part 38 considers that the key image is detected and outputs information indicating that the frame image contains the key image to the system controller 12.

If the key image is not detected, the key image detecting part 38 tries to detect the key image by increasing the size of the key image in stages. In other words, the key image detecting part 38 first tries to detect the key image by using the key image in the smallest size. If the key image is not detected, the key image detecting part 38 tries to detect the key image by using the key image in the next smallest size. If the key image is not detected with the key image in the next smallest size, the key image detecting part 38 tries to detect the key image by using the key image in the following size. If the key image is not detected as in this case, the key image detecting part 38 repeats the key image detecting process by using the key image in bigger size in stages. If the size of the key image used for detecting the key image reaches a certain size, the key image detecting part 38 considers that the frame does not contain the key image and outputs information indicating that the frame has no key image to the system controller 12 and finishes the key image detecting process.

The size of the key image is changed at the image size converting part 36 as mentioned above. The image size converting part 36 converts the size of the key image in response to a command from the system controller 12 and outputs it to the key image detecting part 38.

The external memory I/F 40 includes a memory card slot and accesses memory card 48 inserted in the memory card slot to read/write image data to/from the memory card 48 under the control of the system controller 12.

The print controller 42 controls the printer 44 and causes the printer 44 to print a frame image of a video on a sheet of photographic paper under the control of the system controller 12.

The video recording/playing apparatus 10 of the embodiment has a keyword recording function of automatically recording a video containing a designated keyword, a key image recording function of automatically recording a video containing a designated key image, a person recording function of automatically recording a video containing a designated person's face image, a keyword printing function of automatically printing a frame image of a video containing a designated keyword on a sheet of photographic paper, a key image printing function of automatically printing a frame image of a video containing a designated key image on a sheet of photographic paper, and a person printing function of automatically printing a frame image of a video containing a designated person's a face image on a sheet of photographic paper, as well as a usual video recording/playing function. The functions are switched on the operating part 14. The video recording/playing apparatus 10 operates according to the set functions.

A video is generally recorded according to a recording command from the operating part 14. In other words, when a command for starting to record a video is outputted from the operating part 14, video signals outputted from the tuner 16 are converted into digital video signals at the A/D converter 20, compressed in bandwidth at the bandwidth compressing part 22 and stored in the HDD 24. Alternatively, video signals from an external appliance inputted through the line input terminal 18 are converted into digital video signals at the A/D converter 20, compressed in bandwidth at the bandwidth compressing part 22 and stored in the HDD 24.

The compressed video signals stored in the HDD 24 are read out from the HDD 24 in response to a playing command from the operating part 14, decompressed in bandwidth at the bandwidth decompressing part 26, then converted into analog video signals at the D/A converter 28 and outputted from the line output terminal 30. A video recorded in the video recording/playing apparatus 10 is replayed when the video signals outputted from the line output terminal 30 are inputted into such a image input terminal as a television.

Figure 3:
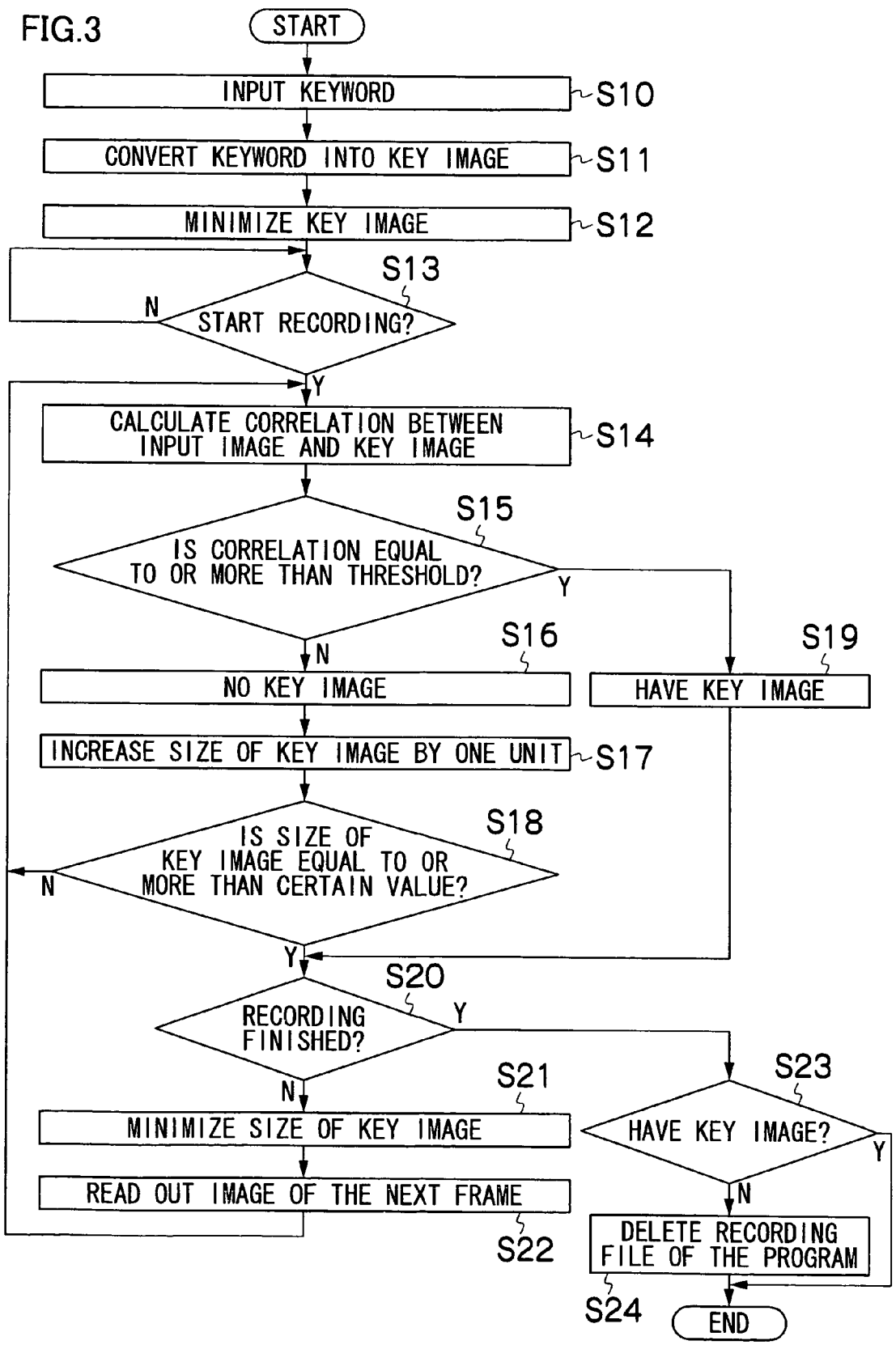
FIG. 3 is a flowchart showing a procedure of processing operations of the video recording/playing apparatus when the apparatus functions to record a keyword.

FIG. 3 is a flowchart showing a procedure of processing operations of the video recording/playing apparatus 10 when the apparatus uses a function of recording a keyword.

Figure 4A:
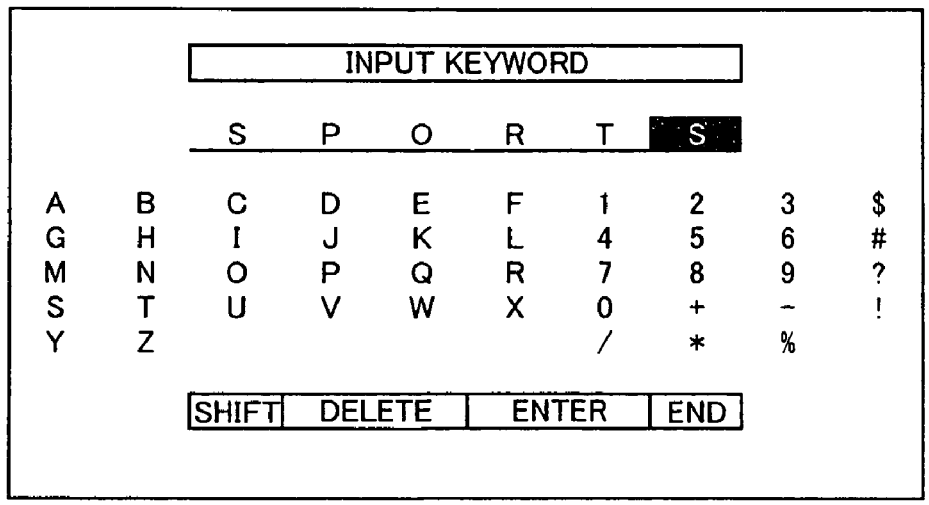
FIGS. 4A, 4B and 4C are schematic diagrams of recording a video when the apparatus functions to record a keyword.

First, a user inputs a keyword from the operating part 14 (step S10). It is assumed that a user inputs a keyword by using a monitor such as a television connected with the video recording/playing apparatus 10 to input characters of a desired keyword by operating the operating part 14, as shown in FIG. 4A.

Figure 4B:
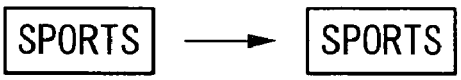

The system controller 12 converts the inputted keyword into a corresponding key image at the image generator 32 as shown in FIG. 4B (step S11). Then, the system controller 12 minimizes the converted key image at the image size converting part 36 (step S12) and outputs the image to the key image detecting part 38.

Thereafter, the system controller 12 determines the presence of a command to start recording from the operating part 14 (step S13). The system controller 12 starts recording video signals outputted from the tuner 16 or video signals inputted through the line input terminal 18 in response to the command to start recording. In other words, the system controller 12 converts the video signals outputted from the tuner 16 or the video signals inputted through the line input terminal 18 into digital video signals at the A/D converter 20, compresses the signals in bandwidth at the bandwidth compressing part 22 and records the signals in the HDD 24.

The digital video signals converted from analog to digital at the A/D converter 20 are compressed in bandwidth at the bandwidth compressing part 22 and recorded in the HDD 24, while being stored in predetermined storage of the HDD 24 as uncompressed state. The uncompressed digital video signals stored in the predetermined storage of the HDD 24 are added to the key image detecting part 38 from the first frame in order.

Figure 4C:
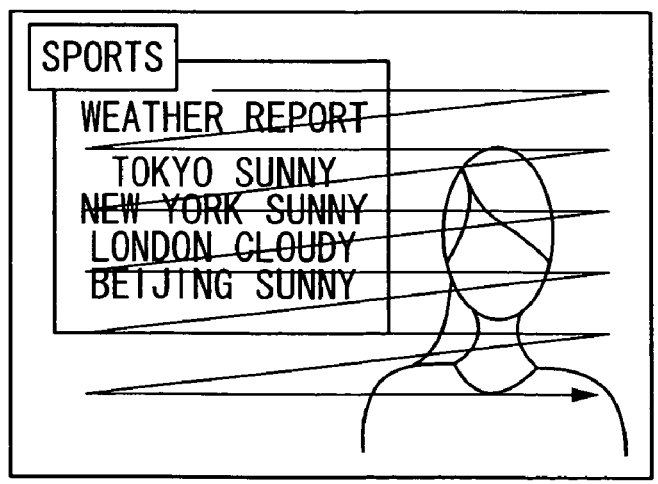

The key image detecting part 38 tries to detect a key image in the inputted frame image as shown in FIG. 4C. In other words, the key image detecting part 38 calculates a correlation value between a frame image and a key image (step S14) and determines whether or not the calculated correlation value is a threshold or more (step S15).

If the correlation value is determined as less than the threshold, the key image detecting part 38 considers that the frame does not contain the key image and outputs information indicating that the frame has no key image to the system controller 12 (step S16). In response to the determination, the system controller 12 increases the size of the key image by one unit at the image size converting part 36 (step S17). Then, the system controller 12 determines whether or not the increased size of the key image is a certain value or more (step S18).

If it is determined that the increased size of the key image is less than a certain value, the system controller 12 adds the increased key image to the key image detecting part 38. The key image detecting part 38 performs process of detecting the key image again based on the key image inputted anew. In other words, the key image detecting part 38 calculates a correlation value between the frame image and the key image (step S14) and determines whether or not the calculated correlation value is the threshold or more (step S15). If it is determined that the correlation value is less than the threshold, the key image detecting part 38 considers that the frame does not contain the key image and outputs information indicating that the frame has no key image to the system controller 12 (step S16). In response to the determination, the system controller 12 increases the size of the key image by one unit at the image size converting part 36 (step S17) and determines whether or not the size of the key image is a certain value or more (step S18).

If the key image is not detected in a frame as in this case, the system controller 12 increases the size of the key image in stages and causes the key image detecting part 38 to repeatedly perform process of detecting the key image. If the size of the key image is a certain value or more, the key image detecting part 38 considers that the frame does not contain the key image and outputs information indicating that the frame has no key image to the system controller 12. In response to the determination, the system controller 12 finishes process of detecting the key image in the frame.

If the key image detecting part 38 detects the key image in the abovementioned process of detecting the key image, i.e., if it is determined that a correlation value between the key image and a frame image is the threshold or more at step S15, the key image detecting part 38 outputs information indicating that the frame contains the key image to the system controller 12 (step S19). In response to the information, the system controller 12 stores information on a location of the frame containing the key image in predetermined storage of the HDD 24 and finishes the process of detecting the key image in the frame.

After the process of detecting a key image has been performed on a frame forming a video, the system controller 12 determines the presence of a command to finish recording (step S20). If it is determined that recording has not finished yet, the system controller 12 performs the process of detecting the key image in the next frame. In this case, the system controller 12 first minimizes the size of the key image at the image size converting part 36 (step S21) and inputs the minimized key image to the key image detecting part 38. Then, the system controller 12 reads out an image of the next frame from the HDD 24 and inputs it into the key image detecting part 38 (step S22). The key image detecting part 38 performs the process of detecting the key image of the steps S14-S20 on the frame image inputted anew.

When the process of detecting a key image finishes for a frame, uncompressed video signals of the frame, for which the process of detecting the key image finished, are deleted from the HDD 24. In other words, the uncompressed video signals recorded in the HDD 24 with the compressed video signals are deleted from the HDD 24 from the first frame in order each time the process of detecting a key image finishes for a frame.

As mentioned above, the system controller 12 performs the process of detecting a key image for each frame forming a video in order and determines whether recording process finishes or not each time the detecting process finishes for each frame (step S20).

If it is determined that the recording process has finished, the system controller 12 determines whether the recorded video contains the key image or not (step S23). In other words, the system controller 12 determines whether the video contains the key image or not based on the presence of information on a location of a frame in the HDD 24, as the information on a location of a frame containing the key image is recorded in a predetermined area of the HDD 24, if the video contains the key image as mentioned above, based on which.

If it is determined that the video does not contain the key image, the system controller 12 deletes all the compressed video signals, which were compressed in bandwidth and recorded in the HDD 24, from the HDD 24 (step S24).

If it is determined that the video contains the key image, the system controller 12 saves the compressed video signals, which were compressed in bandwidth and recorded in the HDD 24, instead of deleting them. The system controller 12 saves the compressed video signals in association with information on a location of a frame containing the detected key image. With this information, a scene containing a keyword can be easily replayed when the recorded video is replayed.

When the video recording/playing apparatus 10 uses a keyword recording function like this, only a video containing an inputted keyword on a screen is automatically recorded. Accordingly, if only a user sets a keyword, the user is assured of recording programs containing the keyword without fail.

Although the embodiment is illustrated with an example of using a single keyword, a user can set multiple keywords. In such a case, a key image is generated for each of the set keywords, and the process of detecting a key image is performed on each frame for all the generated key images. In this case, the invention can be adapted to determine that a frame contains a key image only when all the key images generated from the set keyword are detected or when at least a single key image generated from the set keyword is detected.

Although the embodiment is illustrated to perform the process of detecting a key image on all the frames forming a video, the present invention can be adapted to pick frame images at a certain interval and perform the process of detecting a key image in the picked up frame images.

Although the embodiment is illustrated that a user operates to start and end recording, the present invention automatically records a video broadcast at a set channel at a set time if the present invention uses a reserve recording function.

Figure 5:
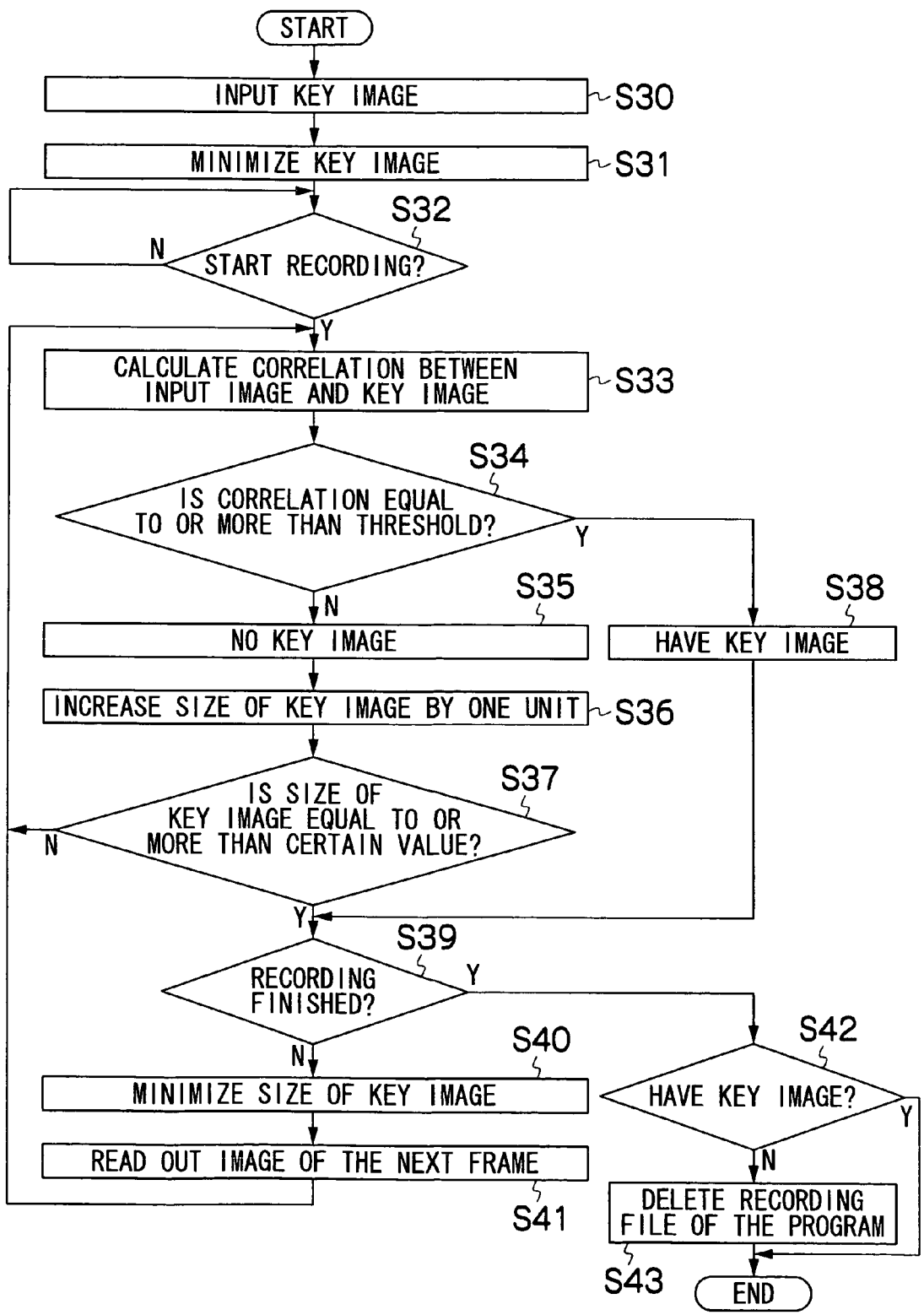
FIG. 5 is a flowchart showing a procedure of processing operations of the video recording/playing apparatus when the apparatus functions to record a key image.

FIG. 5 is a flowchart showing a procedure of processing operations of the video recording/playing apparatus 10 when the apparatus uses a function of recording a key image.

Figure 6A:
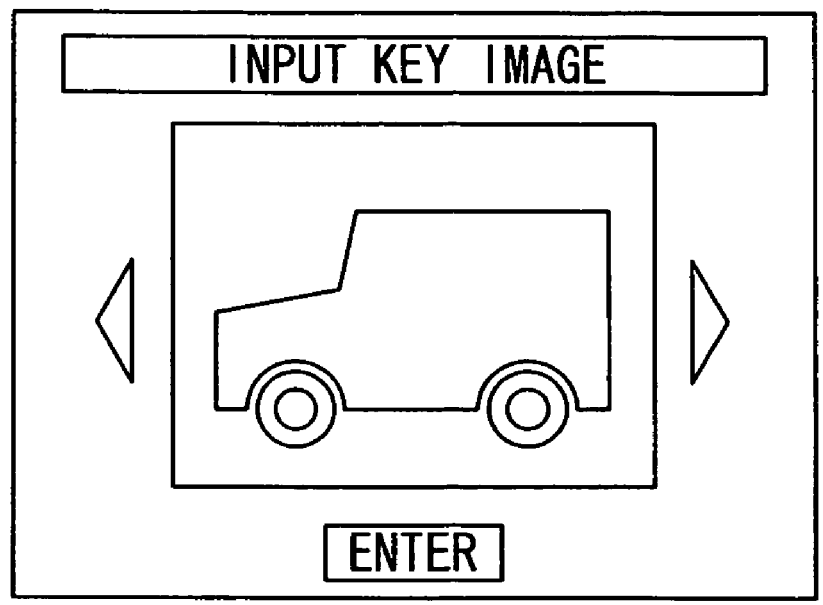
FIGS. 6A and 6B are schematic diagrams of recording a video when the apparatus functions to record a key image.

First, a user inputs a key image (step S30). The key image is inputted when a memory card 48 storing the key image is inserted in a memory card slot and the key image stored on the memory card 48 is read via the external memory I/F 40. When a plurality of images are stored in the memory card 48, the video recording/playing apparatus 10 can be adapted to replay the images read out from the memory card 48 on a monitor such as a television connected to the video recording/playing apparatus 10 for a user to select one from the images and make the image as a key image as shown in FIG. 6A. The system controller 12 minimizes the key image inputted in this manner at the image size converting part 36 (step S31) and outputs it to the key image detecting part 38.

Thereafter, the system controller 12 determines the presence of a command to start recording from the operating part 14 (step S32). In response to the command to start recording, the system controller 12 starts recording video signals outputted from the tuner 16 or video signals inputted through the line input terminal 18. In other words, the system controller 12 converts video signals outputted from the tuner 16 or video signals inputted through the line input terminal 18 into digital video signals at the A/D converter 20 and compresses the signals in bandwidth at the bandwidth compressing part 22 and records it in the HDD 24, while storing uncompressed digital video signals converted from analog to digital at the A/D converter 20 in predetermined storage of the HDD 24. The uncompressed digital video signals stored in the predetermined storage of the HDD 24 are added to the key image detecting part 38 from the first frame in order.

Figure 6B:
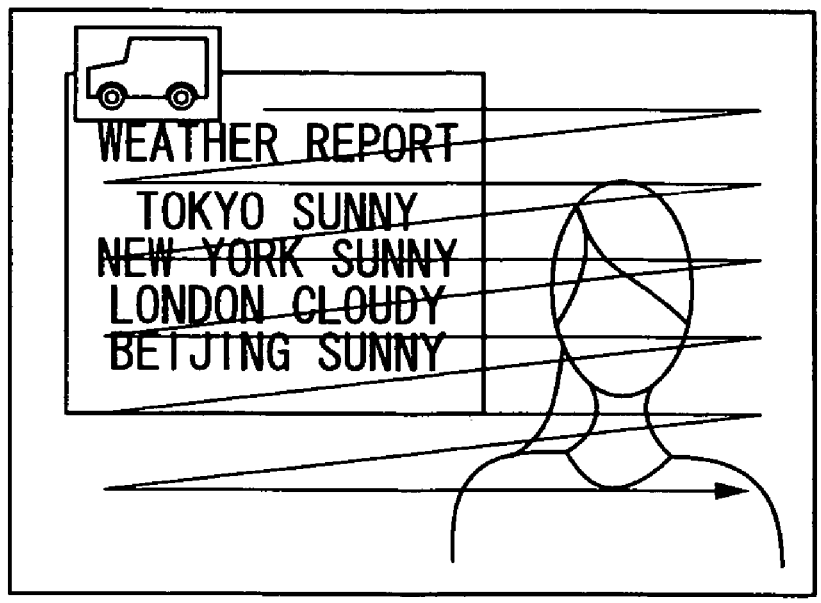

The key image detecting part 38 tries to detect the key image in the inputted frame image as shown in FIG. 6B. In other words, the key image detecting part 38 calculates a correlation value between the frame image and the key image (step S33) and determines whether or not the calculated correlation value is the threshold or more (step S34).

If it is determined that the correlation value is less than the threshold, the key image detecting part 38 considers that the frame does not contain the key image and outputs information indicating that the frame has no key image to the system controller 12 (step S35). In response to the determination, the system controller 12 increases the size of the key image by one unit at the image size converting part 36 (step S36). Then, the system controller 12 determines whether or not the increased size of the key image is a certain value or more (step S37).

If it is determined that the increased size of the key image is less than the certain value, the system controller 12 adds the key image in the increased size to the key image detecting part 38. The key image detecting part 38 performs the process of detecting the key image again based on the key image inputted anew. In other words, the key image detecting part 38 calculates a correlation value between a frame image and the key image (step S33) and determines whether or not the calculated correlation value is threshold or more (step S34). If it is determined that the correlation value is less than the threshold, the key image detecting part 38 considers that the frame does not contain the key image and outputs information indicating that the frame has no key image to the system controller 12 (step S35). In response to the determination, the system controller 12 increases the size of the key image by one unit at the image size converting part 36 (step S36) and determines whether or not the size of the key image is a certain value or more (step S37).

If no key image is detected in a frame as in this case, the system controller 12 increases the size of the key image in stages and causes the key image detecting part 38 to repeatedly perform the process of detecting the key image. If the size of the key image is a certain value or more, the key image detecting part 38 considers that the frame does not contain the key image and outputs information indicating that the frame has no key image to the system controller 12. In response to the determination, the system controller 12 finishes the process of detecting the key image in the frame.

If the key image detecting part 38 detects the key image in the abovementioned process of detecting the key image, i.e., if it is determined that a correlation value between the key image and a frame image is the threshold or more at step S34, the key image detecting part 38 outputs information indicating that the frame has the key image to the system controller 12 (step S38). In response to the information, the system controller 12 stores information on a location of the frame containing the key image in predetermined storage of the HDD 24 and finishes the process of detecting the key image in the frame.

After the process of detecting a key image has been performed on a frame forming a video, the system controller 12 determines the presence of a command to finish recording (step S39). If it is determined that recording has not finished yet, the system controller 12 performs the process of detecting the key image on the next frame. In this case, the system controller 12 first minimizes the size of the key image at the image size converting part 36 (step S40) and inputs the minimized key image to the key image detecting part 38. Then, the system controller 12 reads out an image of the next frame from the HDD 24 and inputs it into the key image detecting part 38 (step S41). The key image detecting part 38 performs the process of detecting the key image of the steps S33-S39 on the frame image inputted anew.

When the process of detecting a key image finishes for a frame, uncompressed video signals of the frame, for which the process of detecting the key image has finished, are deleted from the HDD 24. In other words, the uncompressed video signals recorded in the HDD 24 with the compressed video signals are deleted from the HDD 24 from the first frame in order each time the process of detecting a key image finishes for a frame.

As mentioned above, the system controller 12 performs the process of detecting a key image on each frame forming a video in order and determines whether recording process finishes or not each time the detecting process finishes for each frame (step S39).

If it is determined that the recording process has finished, the system controller 12 determines whether the recorded video contains the key image or not (step S42). In other words, the system controller 12 determines whether the recorded video contains the key image or not based on the presence of information on a location of a frame in the HDD 24, as the information on a location of a frame containing the key image is recorded in a predetermined area of the HDD 24, if the video contains the key image as mentioned above.

If it is determined that the frame image does not contain the key image, the system controller 12 deletes all the compressed video signals, which were compressed in bandwidth and recorded in the HDD 24 (step S43).

If it is determined that the frame image contains the key image, the system controller 12 saves the compressed video signals as they are, which were compressed in bandwidth and recorded in the HDD 24, instead of deleting them. The system controller 12 saves the compressed video signals in association with information on a location of a frame containing the detected key image. With this information, a scene containing a keyword can be easily replayed.

When the video recording/playing apparatus 10 uses a keyword recording function like this, only a video containing an inputted key image on a screen is automatically recorded. Accordingly, if only a user sets a key image, the user is assured of recording programs containing the key image without fail.

Although the embodiment is illustrated with an example of using a single key image, a user can sets multiple key images. In such a case, the process of detecting the key image is performed on each frame for all the multiple key images set. In this case, the invention can be adapted to determine that a frame contains a key image only when all the set key images are detected or when at least one of the set key images is detected.

Although the embodiment is illustrated to perform the process of detecting a key image on all the frames forming a video, the present invention can be adapted to pick frame images at a certain interval and perform the process of detecting a key image in the picked up frame images.

Figure 7:
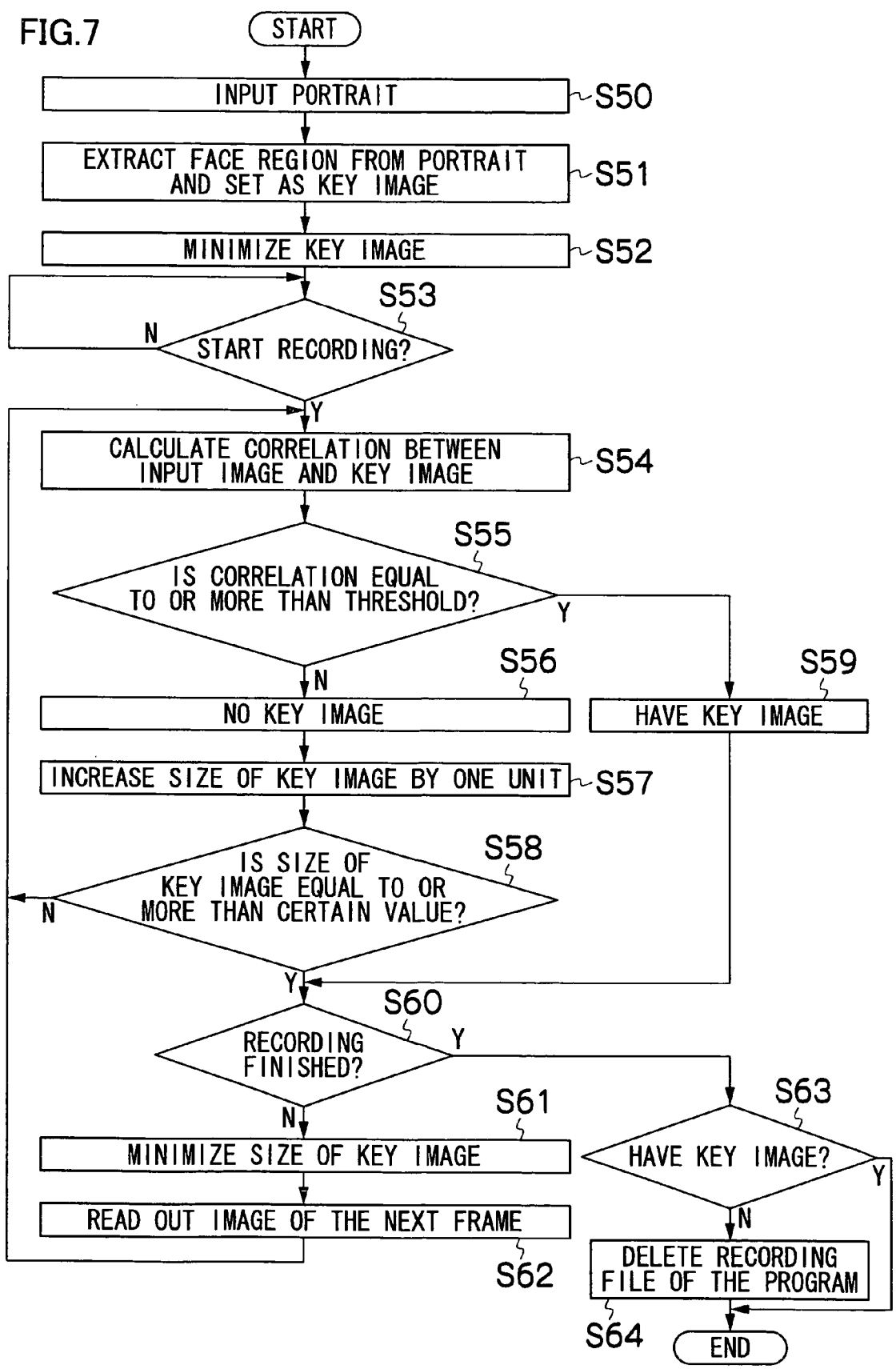
FIG. 7 is a flowchart showing a procedure of processing operations of the video recording/playing apparatus when the apparatus functions to record a portrait.

FIG. 7 is a flowchart showing a procedure of processing operations of the video recording/playing apparatus 10 when the apparatus uses a function of recording a portrait.

Figure 8A:
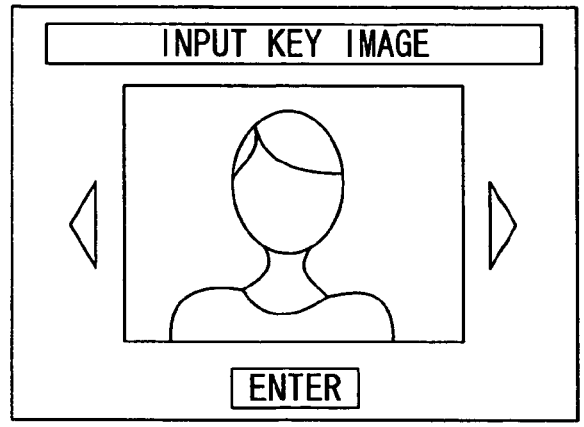
FIGS. 8A, 8B and 8C are schematic diagrams of recording a video when the apparatus functions to record a portrait.

First, a user inputs a portrait of a person (step S50). The portrait is inputted when a memory card 48 storing the portrait is inserted in a memory card slot and the key image stored on the memory card 48 is read via the external memory I/F 40, as in the abovementioned manner of inputting a key image. When a plurality of images are stored in the memory card 48, the video recording/playing apparatus 10 can be adapted to replay the images read out from the memory card 48 on a monitor such as a television connected to the video recording/playing apparatus 10 for a user to select one from the images and make the image as a key image as shown in FIG. 8A.

Figure 8B:
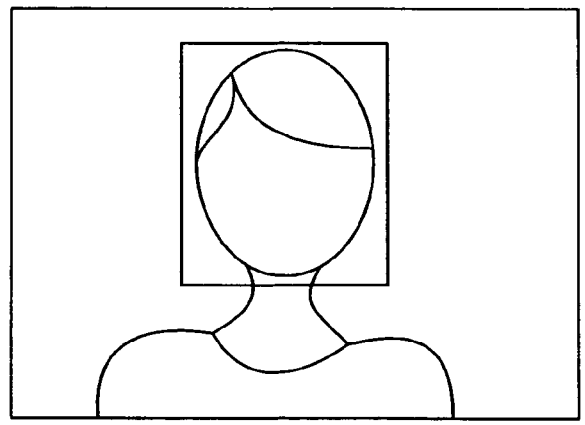

The system controller 12 adds the portrait inputted in this manner to the face extracting part 34 and extracts a face region from the portrait as shown in FIG. 8B. Then, the system controller 12 sets the extracted face image as a key image (step S51). The key image formed by the set face image of a person is added to the image size converting part 36 and minimized (step S52) and added to the key image detecting part 38.

Thereafter, the system controller 12 determines the presence of a command to start recording from the operating part 14 (step S53). The system controller 12 starts recording video signals outputted from the tuner 16 or video signals inputted through the line input terminal 18 in response to the command to start recording. In other words, the system controller 12 converts the video signals outputted from the tuner 16 or the video signals inputted from the line input terminal 18 into digital video signals at the A/D converter 20, compresses the signals in bandwidth at the bandwidth compressing part 22 and records the signals in the HDD 24, while storing uncompressed digital video signals converted from analog to digital at the A/D converter 20 to predetermined storage of the HDD 24. The uncompressed digital video signals stored in the predetermined storage of the HDD 24 are added to the key image detecting part 38 from the first frame in order.

Figure 8C:
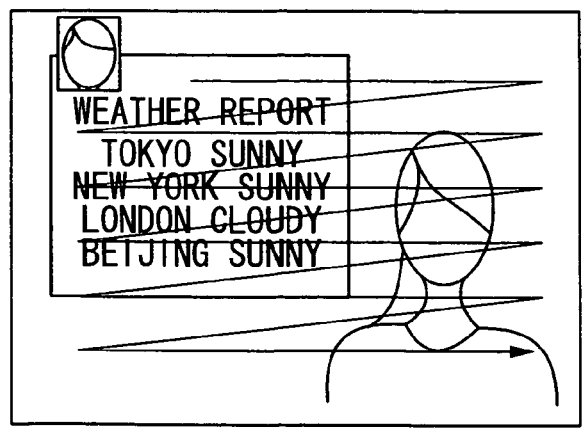

The key image detecting part 38 tries to detect a key image in the inputted frame image as shown in FIG. 8C. In other words, the key image detecting part 38 calculates a correlation value between the frame image and a key image (step S54) and determines whether or not the calculated correlation value is the threshold or more (step S55).

If it is determined that the correlation value is less than the threshold, the key image detecting part 38 considers that the frame does not contain the key image and outputs information indicating that the frame has no key image to the system controller 12 (step S56). In response to the determination, the system controller 12 increases the size of the key image by one unit at the image size converting part 36 (step S57). Then, the system controller 12 determines whether or not the increased size of the key image is a certain value or more (step S58).

If it is determined that the increased size of the key image is less than the certain value, the system controller 12 adds the increased key image to the key image detecting part 38. The key image detecting part 38 performs the process of detecting the key image again based on the key image inputted anew. In other words, the key image detecting part 38 calculates a correlation value between a frame image and the key image (step S54) and determines whether or not the calculated correlation value is the threshold or more (step S55). If it is determined that the correlation value is less than the threshold, the key image detecting part 38 considers that the frame does not contain the key image and outputs information indicating that the frame has no key image to the system controller 12 (step S56). In response to the determination, the system controller 12 increases the size of the key image by one unit at the image size converting part 36 (step S57) and determines whether or not the size of the key image is a certain value or more (step S58).

If no key image is detected in a frame as in this case, the system controller 12 increases the size of the key image in stages and causes the key image detecting part 38 to repeatedly perform the process of detecting the key image. If the size of the key image is a certain value or more, the key image detecting part 38 considers that the frame does not contain the key image and outputs information indicating that the frame has no key image to the system controller 12. In response to the determination, the system controller 12 finishes the process of detecting the key image in the frame.

If the key image detecting part 38 detects the key image in the abovementioned process of detecting the key image, i.e., if it is determined that a correlation value between the key image and a frame image is the threshold or more at step S55, the key image detecting part 38 outputs information indicating that the frame has the key image to the system controller 12 (step S59). In response to the information, the system controller 12 stores information on a location of the frame containing the key image in predetermined storage of the HDD 24 and finishes the process of detecting the key image in the frame.

After the process of detecting a key image has been performed on a frame forming a video, the system controller 12 determines the presence of a command to finish recording (step S60). If it is determined that recording has not finished yet, the system controller 12 performs the process of detecting the key image on the next frame. In this case, the system controller 12 first minimizes the size of the key image at the image size converting part 36 (step S61) and inputs the minimized key image to the key image detecting part 38. Then, the system controller 12 reads out an image of the next frame from the HDD 24 and inputs the image into the key image detecting part 38 (step S62). The key image detecting part 38 performs the process of detecting the key image of the steps S54-S60 on the frame image inputted anew.

When the process of detecting a key image finishes for a frame, uncompressed video signals of the frame, for which the process of detecting the key image has finished, are deleted from the HDD 24. In other words, the uncompressed video signals recorded in the HDD 24 with the compressed video signals are deleted from the HDD 24 from the first frame in order each time the process of detecting a key image finishes for a frame.

As mentioned above, the system controller 12 performs the process of detecting a key image on each frame forming a video in order and determines whether recording process finishes or not each time the detecting process finishes for each frame (step S60).

If it is determined that the recording process has finished, the system controller 12 determines whether the recorded video contains the key image or not (step S63). In other words, the system controller 12 determines whether the recorded video contains the key image or not based on the presence of information on a location of a frame in the HDD 24, as the information on a location of a frame containing the key image is recorded in a predetermined area of the HDD 24, if the video contains the key image as mentioned above.

If it is determined that the frame image does not contain the key image, the system controller 12 deletes all the compressed video signals, which were compressed in bandwidth and recorded in the HDD 24 (step S64).

If it is determined that the frame image contains the key image, the system controller 12 saves the compressed video signals as they are, which were compressed in bandwidth and recorded in the HDD 24, instead of deleting them. The system controller 12 saves the compressed video signals in association with information on a location of a frame containing the detected key image. With this information, a scene containing a keyword can be easily replayed when the recorded video is replayed.

When the video recording/playing apparatus 10 uses a portrait recording function like this, only a video containing a person designated by a portrait on a screen is automatically recorded. Accordingly, if only a user sets a person, the user is assured of recording the programs containing the person without fail.

Although the embodiment is illustrated with an example of using a person is to be detected, a user can sets multiple persons to be detected. Multiple images of different expressions of a person can be used for detection. The present invention can be adapted to determine that a frame contains a key image only when all the set persons are detected in the fame or when at least one of the set persons is detected, in a case that a user sets multiple persons.

Although the embodiment is illustrated to perform the process of detecting a key image for all the frames forming a video, the present invention can be adapted to pick frame images at a certain interval and perform the process of detecting a key image in the picked up frame images.

Figure 9:
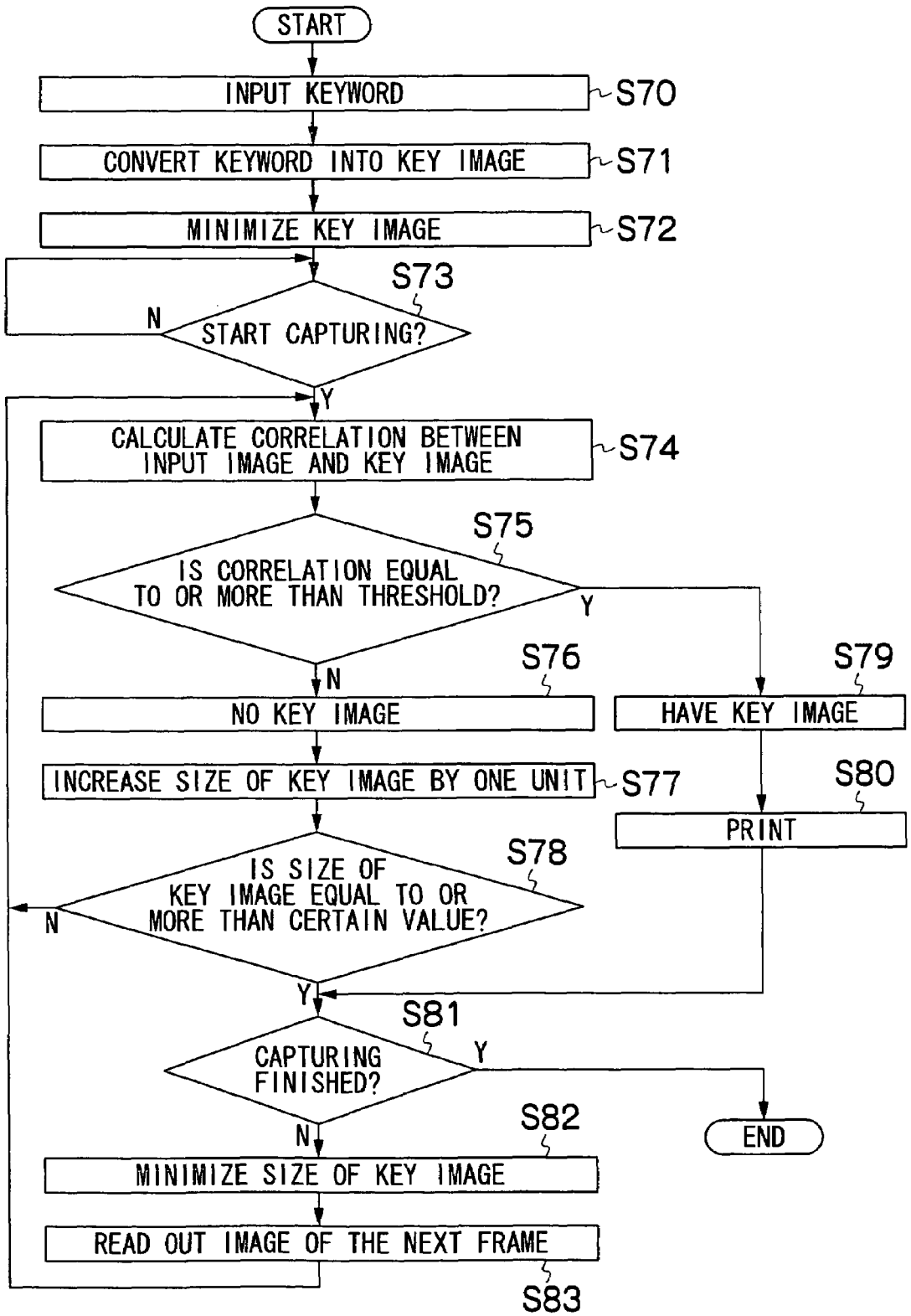
FIG. 9 is a flowchart showing a procedure of processing operations of the video recording/playing apparatus when it functions to print a keyword.

FIG. 9 is a flowchart showing a procedure of processing operations of the video recording/playing apparatus 10 when the apparatus uses a function of printing a keyword.

First, a user inputs a keyword from the operating part 14 (step S70). The keyword is inputted in the same way as in the abovementioned keyword recording function.

The system controller 12 converts the inputted keyword into a corresponding key image at the image generator 32 (step S71). Then, the system controller 12 minimizes the converted key image at the image size converting part 36 (step S72) and outputs the image to the key image detecting part 38.

Thereafter, the system controller 12 determines the presence of a command to start capturing a video from the operating part 14 (step S73) and starts capturing video signals outputted from the tuner 16 or video signals inputted from the line input terminal 18 in response to the command to start capturing. In other words, the system controller 12 converts the video signals outputted from the tuner 16 or the video signals inputted from the line input terminal 18 into digital video signals at the A/D converter 20 and stores them in predetermine storage of the HDD 24. The digital video signals stored in the predetermined storage of the HDD 24 are added to the key image detecting part 38 from the first frame in order.

The key image detecting part 38 tries to detect a key image in the inputted frame image. In other words, the key image detecting part 38 calculates a correlation value between the frame image and a key image (step S74) and determines whether or not the calculated correlation value is the threshold or more (step S75).

If it is determined that the correlation value is less than the threshold, the key image detecting part 38 considers that the frame does not contain the key image and outputs information indicating that the frame has no key image to the system controller 12 (step S76). In response to the determination, the system controller 12 increases the size of the key image by one unit at the image size converting part 36 (step S77). Then, the system controller 12 determines whether or not the increased size of the key image is a certain value or more (step S78).

If it is determined that the increased size of the key image is less than the certain value, the system controller 12 adds the increased key image to the key image detecting part 38. The key image detecting part 38 performs the process of detecting the key image again based on the key image inputted anew. In other words, the key image detecting part 38 calculates a correlation value between a frame image and the key image (step S74) and determines whether or not the calculated correlation value is the threshold or more (step S75). If it is determined that the correlation value is less than the threshold, the key image detecting part 38 considers that the frame does not contain the key image and outputs information indicating that the frame has no key image to the system controller 12 (step S76). In response to the determination, the system controller 12 increases the size of the key image by one unit at the image size converting part 36 (step S77) and determines whether or not the size of the key image is a certain value or more (step S78).

If no key image is detected in a frame as in this case, the system controller 12 increases the size of the key image in stages and causes the key image detecting part 38 to repeatedly perform the process of detecting the key image. If the size of the key image is a certain value or more, the key image detecting part 38 considers that the frame does not contain the key image and outputs information indicating that the frame has no key image to the system controller 12. In response to the determination, the system controller 12 finishes the process of detecting the key image in the frame.

If the key image detecting part 38 detects the key image in the abovementioned process of detecting the key image, i.e., if it is determined that a correlation value between the key image and a frame image is the threshold or more at step S75, the key image detecting part 38 outputs information indicating that the frame has the key image to the system controller 12 (step S79). In response to the information, the system controller 12 causes the printer 44 to print the frame image containing the key image via the print controller 42 (step S80).

After the process of detecting a key image has been performed on a frame forming a video, the system controller 12 determines whether the video has captured or not (step S81). If it is determined that the key image has not captured yet, the system controller 12 performs the process of detecting the key image on the next frame. In this case, the system controller 12 first minimizes the size of the key image at the image size converting part 36 (step S82) and inputs the minimized key image to the key image detecting part 38. Then, the system controller 12 reads out an image of the next frame from the HDD 24 and inputs the image into the key image detecting part 38 (step S83). The key image detecting part 38 performs the process of detecting the key image of the steps S74-S80 on the frame image inputted anew.

When the process of detecting a key image finishes for a frame, uncompressed video signals of the frame, for which the process of detecting a key image has finished, are deleted from the HDD 24. In other words, the uncompressed video signals recorded in the HDD 24 with the compressed video signals are deleted from the HDD 24 from the first frame in order each time the process of detecting a key image finishes for a frame.

As mentioned above, the system controller 12 performs the process of detecting a key image on each frame forming a video in order and determines whether capturing of a video finishes or not each time the detecting process for each frame finishes (step S81). If it is determined that the recording process has finished, the system controller 12 finishes the keyword print process.

When the video recording/playing apparatus 10 uses a keyword printing function like this, a frame image containing an inputted keyword on a screen is automatically printed on a sheet of photographic paper. Accordingly, if only a user sets a keyword, the frames containing the keyword can be printed.

Although the embodiment is illustrated with an example of using a single keyword, a user can sets multiple keywords. In such a case, a key image is generated for each of the set keywords, and the process of detecting a key image is performed on each frame for all the generated key images. In this case, the invention can be adapted to determine that a frame contains a key image only when all the key images generated from the set keyword are detected or when at least a single key image generated from the set keyword is detected.

Although the embodiment is illustrated to perform the process of detecting a key image on all the frames forming a video, the present invention can be adapted to pick frame images at a certain interval and perform the process of detecting a key image on the picked up frame images.

Although the embodiment is illustrated that a user operates to start and end capturing of a video, the present invention automatically performs print process from a video of a set channel at a set time if the present invention uses a reserve function.

Figure 10:
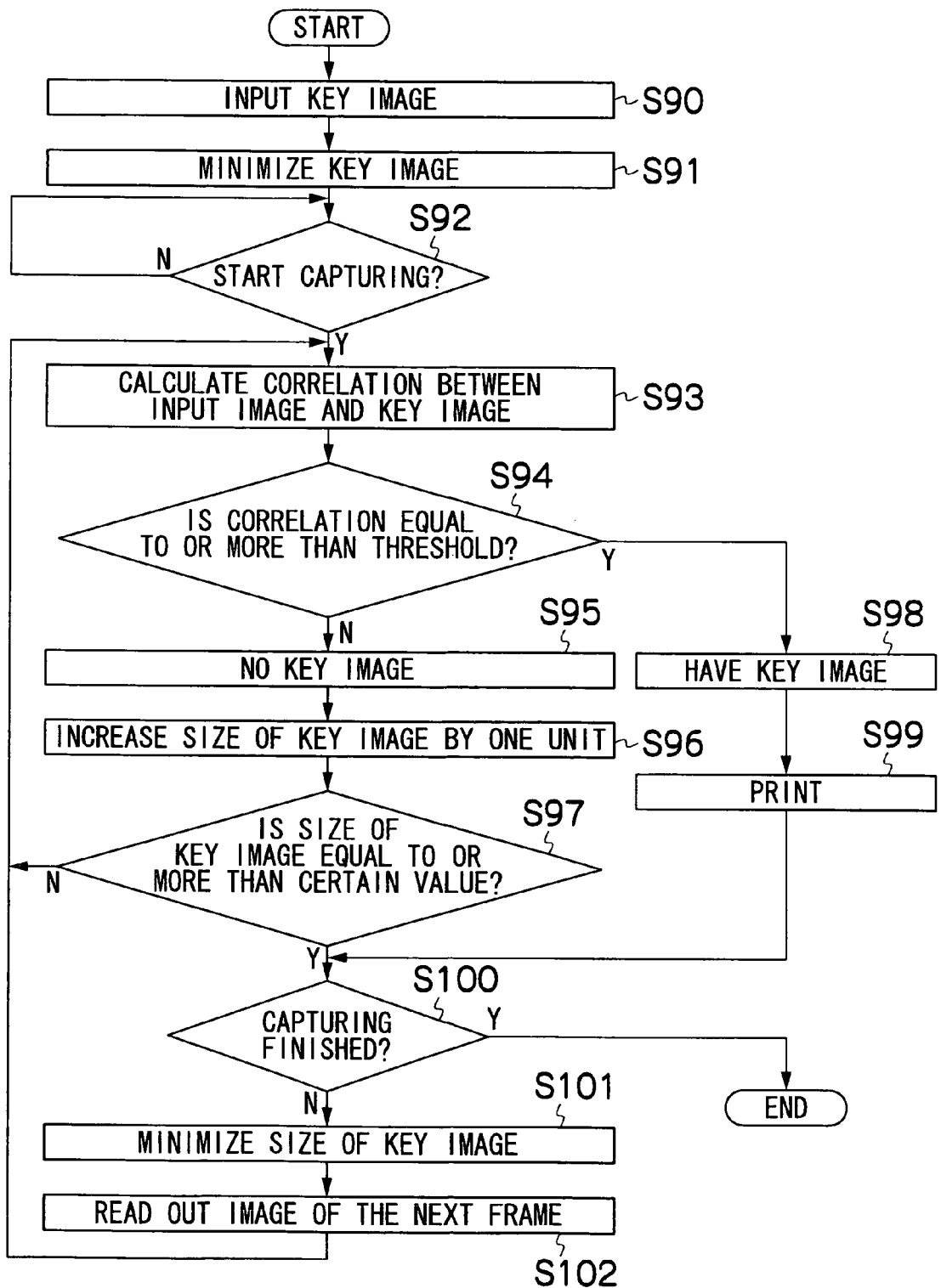
FIG. 10 is a flowchart showing a procedure of processing operations of the video recording/playing apparatus when the apparatus functions to print a key image.

FIG. 10 is a flowchart showing a procedure of processing operations of the video recording/playing apparatus 10 when the apparatus uses a function of printing a key image.

First, a user inputs a key image (step S90). The key image is inputted in the same way as that in the abovementioned key image recording function. The system controller 12 adds the inputted key image to the image size converting part 36, minimizes the image (step S91) and outputs the image to the key image detecting part 38.

Thereafter, the system controller 12 determines the presence of a command to start capturing a video from the operating part 14 (step S92). In response to the command to start capturing, the system controller 12 starts capturing video signals outputted from the tuner 16 or video signals inputted from the line input terminal 18. In other words, the system controller 12 converts the video signals outputted from the tuner 16 or the video signals inputted from the line input terminal 18 into digital video signals at the A/D converter 20 and stores the signals in predetermined storage of the HDD 24. The digital video signals stored in the predetermined storage of the HDD 24 are added to the key image detecting part 38 from the first frame in order.

The key image detecting part 38 tries to detect the key image in the inputted frame image. In other words, the key image detecting part 38 calculates a correlation value between the frame image and a key image (step S93) and determines whether or not the calculated correlation value is the threshold or more (step S94).

If it is determined that the correlation value is less than the threshold, the key image detecting part 38 considers that the frame does not contain the key image and outputs information indicating that the frame has no key image to the system controller 12 (step S95). In response to the determination, the system controller 12 increases the size of the key image by one unit at the image size converting part 36 (step S96). Then, the system controller 12 determines whether or not the increased size of the key image is a certain value or more (step S97).

If it is determined that the increased size of the key image is less than the certain value, the system controller 12 adds the increased key image to the key image detecting part 38. The key image detecting part 38 performs the process of detecting the key image again based on the key image inputted anew. In other words, the key image detecting part 38 calculates a correlation value between a frame image and the key image (step S93) and determines whether or not the calculated correlation value is the threshold or more (step S94). If it is determined that the correlation value is less than the threshold, the key image detecting part 38 considers that the frame does not contain the key image and outputs information indicating that the frame has no key image to the system controller 12 (step S95). In response to the determination, the system controller 12 increases the size of the key image by one unit at the image size converting part 36 (step S96) and determines whether or not the size of the key image is a certain value or more (step S97).

If no key image is detected in a frame as in this case, the system controller 12 increases the size of the key image in stages and causes the key image detecting part 38 to repeatedly perform the process of detecting the key image. If the size of the key image is a certain value or more, the key image detecting part 38 considers that the frame does not contain the key image and outputs information indicating that the frame has no key image to the system controller 12. In response to the determination, the system controller 12 finishes the process of detecting the key image in the frame.

If the key image detecting part 38 detects the key image in the abovementioned process of detecting the key image, i.e., if it is determined that a correlation value between the key image and a frame image is the threshold or more at step S94, the key image detecting part 38 outputs information indicating that the frame has the key image to the system controller 12 (step S98). In response to the information, the system controller 12 causes the printer 44 to print a frame image containing the key image via the controller 42 (step S99).

After the process of detecting a key image has been performed on a frame image forming a video, the system controller 12 determines whether the video has captured or not (step S10). If it is determined that the key image has not captured yet, the system controller 12 performs the process of detecting the key image on the next frame. In this case, the system controller 12 first minimizes the size of the key image at the image size converting part 36 (step S101) and inputs the minimized key image to the key image detecting part 38. Then, the system controller 12 reads out an image of the next frame from the HDD 24 and inputs the image into the key image detecting part 38 (step S102). The key image detecting part 38 performs the process of detecting the key image of the steps S93-S99 on the frame image inputted anew.

When detecting of a key image finishes for a frame, uncompressed video signals of the frame, for which the process of detecting a key image has finished, are deleted from the HDD 24. In other words, the uncompressed video signals recorded in the HDD 24 with the compressed video signals are deleted from the HDD 24 from the first frame in order each time the process of detecting a key image finishes for a frame.

As mentioned above, the system controller 12 performs the process of detecting a key image on each frame forming a video in order and determines whether capturing of a video finishes or not each time the detecting process for each frame finishes (step S100). If it is determined that the recording process has finished, the system controller 12 finishes the keyword print process.

When the video recording/playing apparatus 10 uses a key image printing function like this, a frame image containing an inputted key image on a screen is on a sheet of photographic paper. Accordingly, if only a user sets a key image, the frames containing the keyword can be automatically printed.

Although the embodiment is illustrated with an example of using a single key image, a user can sets multiple key images. In such a case, the process of detecting a key image is performed on each frame for all the generated key images. In this case, the invention can be adapted to determine that a frame contains a key image only when all the set key images are detected or when at least one of the set key images is detected.

Although the embodiment is illustrated to perform the process of detecting a key image on all the frames forming a video, the present invention can be adapted to pick frame images at a certain interval and perform the process of detecting the key image on the picked up frame images.

Although the embodiment is illustrated that a user operates to start and end capturing of a video, the present invention automatically performs print process from a video of a set channel at a set time if the present invention uses a reserve function.

Figure 11:
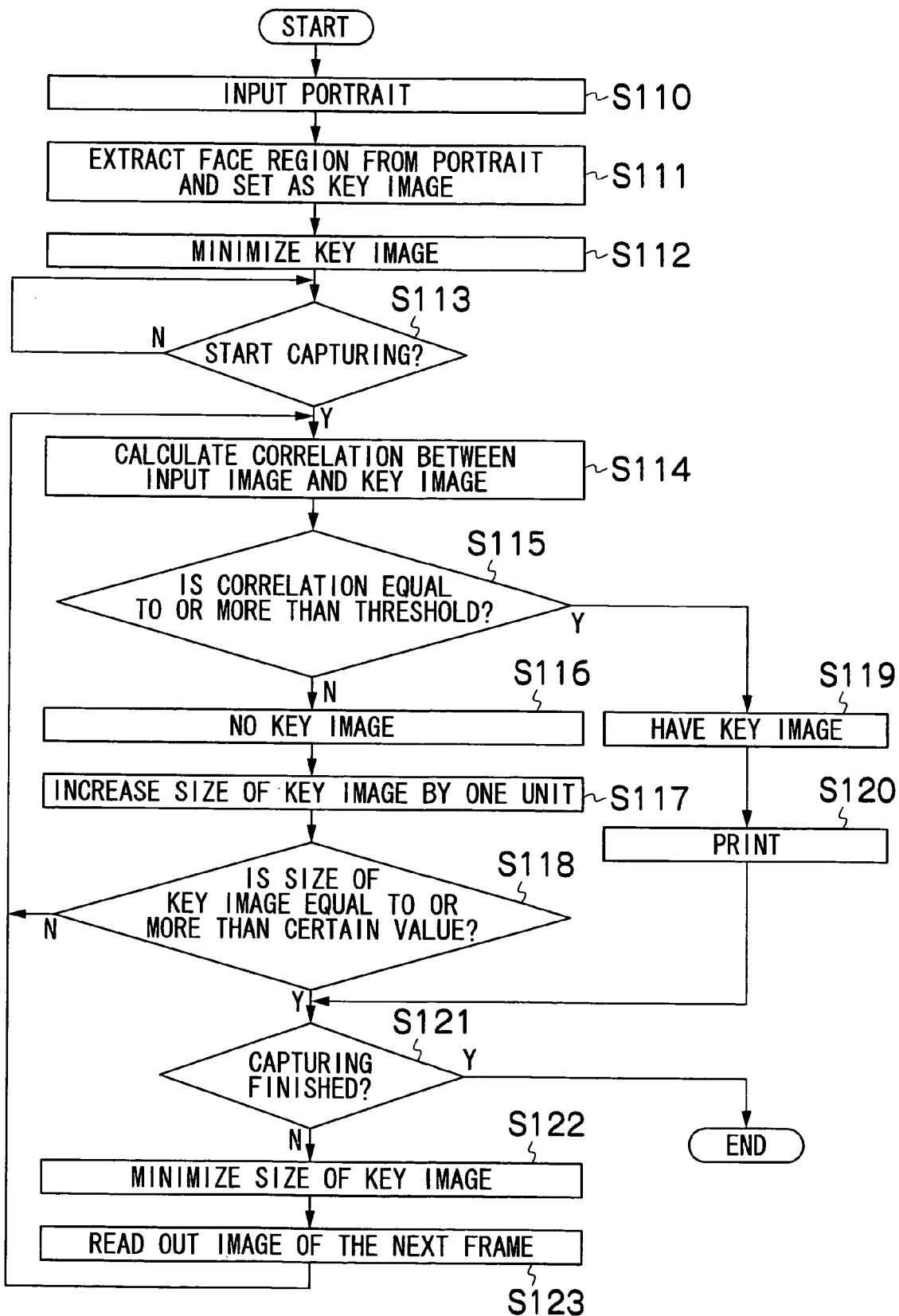
FIG. 11 is a flowchart showing a procedure of processing operations of the video recording/playing apparatus when the apparatus functions to print a portrait.

FIG. 11 is a flowchart showing a procedure of processing operations of the video recording/playing apparatus 10 when the apparatus uses a function of printing a portrait.

First, a user inputs a portrait of a person (step S10). The portrait is inputted in the same way as that in the abovementioned portrait recording function. The system controller 12 adds the inputted portrait to the face extracting part 34 and extracts a face region from the portrait. Then, the system controller 12 sets the extracted face image as a key image (step S111). The key image formed by the set face image of a person is added to the image size converting part 36 and minimizes (step S112) and added to the key image detecting part 38.

Thereafter, the system controller 12 determines the presence of a command to start capturing a video from the operating part 14 (step S113). The system controller 12 starts capturing video signals outputted from the tuner 16 or video signals inputted through the line input terminal 18 in response to the command to start capturing. In other words, the system controller 12 converts the video signals outputted from the tuner 16 or the video signals inputted from the line input terminal 18 into digital video signals at the A/D converter 20 and stores the signals in predetermined storage of the HDD 24. The digital video signals stored in the predetermined storage of the HDD 24 are added to the key image detecting part 38 from the first frame in order.

The key image detecting part 38 tries to detect a key image in the inputted frame images. In other words, the key image detecting part 38 calculates a correlation value between the frame image and a key image (step S114) and determines whether or not the calculated correlation value is the threshold or more (step S115).

If it is determined that the correlation value is less than the threshold, the key image detecting part 38 considers that the frame does not contain the key image and outputs information indicating that the frame has no key image to the system controller 12 (step S116). In response to the determination, the system controller 12 increases the size of the key image by one unit at the image size converting part 36 (step S117). Then, the system controller 12 determines whether or not the increased size of the key image is a certain value or more (step S1118).

If it is determined that the increased size of the key image is less than the certain value, the system controller 12 adds the increased key image to the key image detecting part 38. The key image detecting part 38 performs the process of detecting the key image again based on the key image inputted anew. In other words, the key image detecting part 38 calculates a correlation value between a frame image and the key image (step S114) and determines whether or not the calculated correlation value is the threshold or more (step S115). If it is determined that the correlation value is less than the threshold, the key image detecting part 38 considers that the frame does not contain the key image and outputs information indicating that the frame has no key image to the system controller 12 (step S116). In response to the determination, the system controller 12 increases the size of the key image by one unit at the image size converting part 36 (step S117) and determines whether or not the size of the key image is a certain value or more (step S118).

If no key image is detected in a frame as in this case, the system controller 12 increases the size of the key image in stages and causes the key image detecting part 38 to repeatedly perform the process of detecting the key image. If the size of the key image is a certain value or more, the key image detecting part 38 considers that the frame does not contain the key image and outputs information indicating that the frame has no key image to the system controller 12. In response to the determination, the system controller 12 finishes the process of detecting the key image in the frame.

If the key image detecting part 38 detects the key image in the abovementioned process of detecting the key image, i.e., if it is determined that a correlation value between the key image and a frame is the threshold or more at step S115, the key image detecting part 38 outputs information indicating that the frame has the key image to the system controller 12 (step S119). In response to the information, the system controller 12 causes the printer 44 to print a frame image containing the key image via the print controller 42 (step S120).

After the process of detecting a key image has been performed on a frame image forming a video, the system controller 12 determines whether the video has captured or not (step S121). If it is determined that the key image has not captured yet, the system controller 12 performs the process of detecting the key image on the next frame. In this case, the system controller 12 first minimizes the size of the key image at the image size converting part 36 (step S122) and inputs the minimized key image to the key image detecting part 38. Then, the system controller 12 reads out an image of the next frame from the HDD 24 and inputs the image into the key image detecting part 38 (step S123). The key image detecting part 38 performs the process of detecting the key image of the steps S114-S120 on the frame image inputted anew.

When the process of detecting a key image finishes for a frame, uncompressed video signals of the frame, for which the process of detecting the key image has finished, are deleted from the HDD 24. In other words, the uncompressed video signals recorded in the HDD 24 with the compressed video signals are deleted from the HDD 24 from the first frame in order each time the process of detecting a key image finishes for a frame.

As mentioned above, the system controller 12 performs the process of detecting a key image on each frame forming a video in order and determines whether capturing of a video finishes or not each time the detecting process finishes for each frame (step S121). If it is determined that the recording process has finished, the system controller 12 finishes the keyword print process.

When the video recording/playing apparatus 10 uses a key image printing function like this, a frame image containing an inputted key word on a screen is on a sheet of photographic paper. Accordingly, if only a user sets a key image, the frames containing the keyword can be automatically printed.

Although the embodiment is illustrated with an example of using a single portrait of a person as a key image, a user can set multiple portraits for the key image. In such a case, the process of detecting the key image is performed on each frame for all the multiple key images set. In this case, the invention can be adapted to determine that a frame contains a key image only when all the set key images are detected or when at least one of the set key images is detected.

Although the embodiment is illustrated to perform the process of detecting a key image on all the frames forming a video, the present invention can be adapted to pick frame images at a certain interval and perform the process of detecting a key image on the picked up frame images.

Although the embodiment is illustrated that a user operates to start and end capturing of a video, the present invention automatically performs print process from a video of a set channel at a set time if the present invention uses a reserve function.

As mentioned above, the video recording/playing apparatus 10 has a function of automatically recording a video containing a designated keyword, a function of automatically recording a video containing a designated key image, a function of automatically recording a video containing a face image of a designated person, a function of automatically printing a frame of a video containing a designated keyword on a sheet of photographic paper, a function of automatically printing a frame of a video containing a designated key image on a sheet of photographic paper, and a function of automatically printing a frame of a video containing a face image of a designated person, in addition to a usual video recording/playing function. With these functions, the video recording/playing apparatus 10 can automatically record a video containing a particular image without fail and automatically print a frame image containing the image.

Although a period for recording a video is designated in the abovementioned embodiment, the present invention can be adapted to capture a video continuously without requiring a user to designate the period for recording. In such a case, the present invention determines the presence of a key image by a predetermined time period (for example, half an hour, one hour, etc.,) and deletes compressed video signals from the HDD 24. In other words, the present invention determines the presence of a key image for every half an hour. If the present invention does not detect a key image for half an hour, the compressed video signals for the time period are deleted from the HDD 24. This assures a user of recording only a necessary video.

Figure 12:
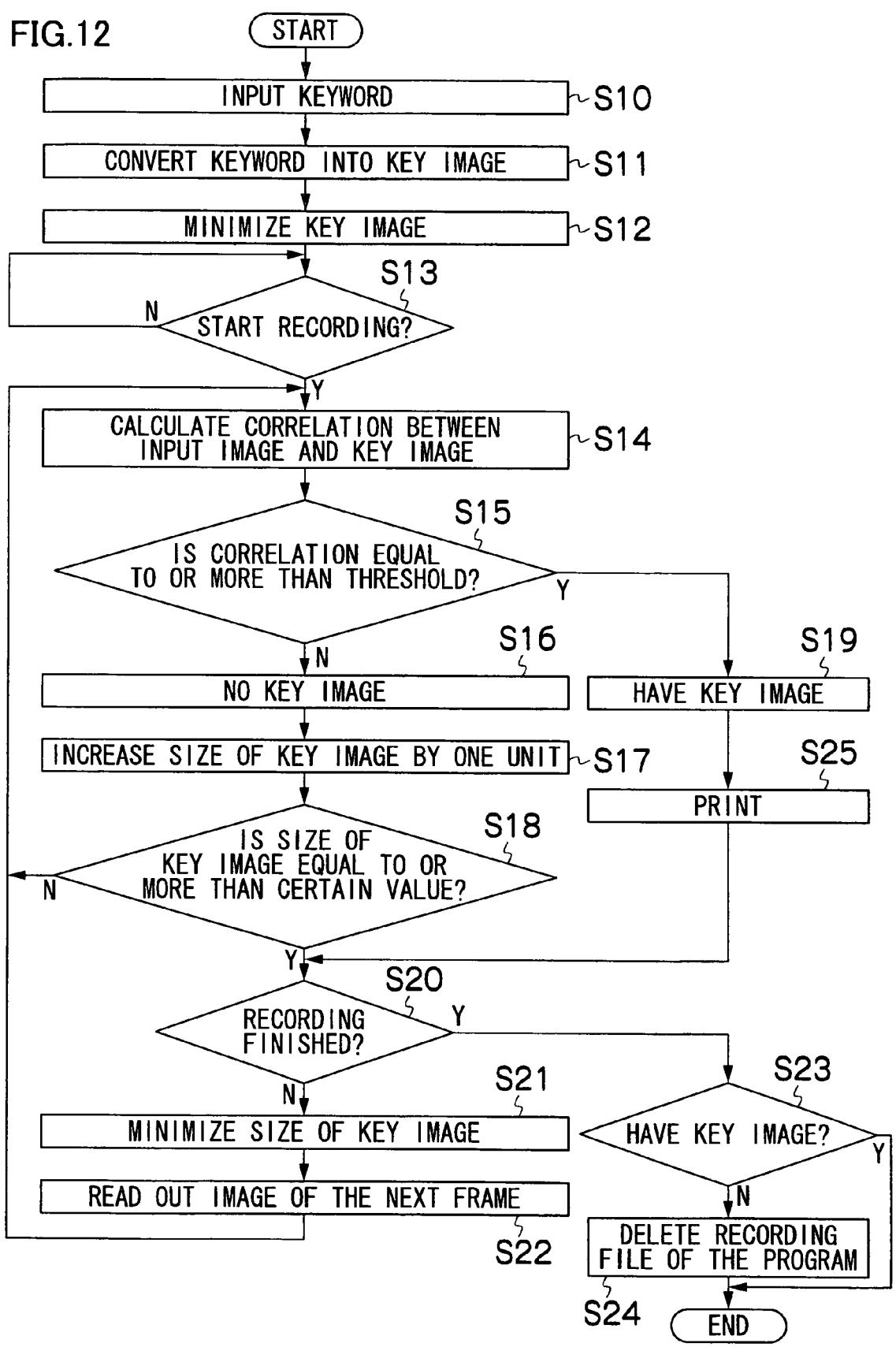
FIG. 12 is a flowchart showing a procedure of processing operations of the video recording/playing apparatus when a video is recorded and printed at the same time.

Although recording and printing of a video are selectively performed in the abovementioned embodiment, they can be performed simultaneously. FIG. 12 is a flowchart showing a procedure of processing operations of the video recording/playing apparatus 10 when a video is printed as the keyword recording function is used. As shown in the figure, if the key image detecting part 38 determines that a correlation value between a key image and a frame image is the threshold value or more at step S15, it outputs information indicating that the key frame has the key image to the system controller 12 (step S19). In response to the information, the system controller 12 stores information on a location of the frame containing the key image in predetermined storage of the HDD 24 and finishes the process of detecting a key image for the frame, while causing the printer 44 to print the frame image containing the key image via the print controller 42 (step S25). The present invention can be adapted to perform recording process and printing process of a video at the same time like this. Although the abovementioned embodiment shows a case where a keyword recording function is used, recording process and printing process of a video can also be performed simultaneously when a key image recording function or a portrait recording function is used.

What is claimed is:

1. A video recording apparatus comprising:
   a video inputting device for inputting a video;
   a video storing device for storing a video inputted by the video inputting device;
   a portrait inputting device for inputting a portrait;
   a key image extracting device for extracting a person's face image as a key image by the portrait inputted by the portrait inputting device;
   a key image detecting device for detecting a frame containing a key image extracted by the key image extracting device in a video inputted by the video inputting device; and
   a video deleting device for deleting a video stored in the video storing device when no frame containing a key image is detected by the key image detecting device.

2. The video recording apparatus according to claim 1, comprising:
   a size changing device for changing a size of the key image in stages;
   wherein the key image detecting device detects a frame containing a key image in a video inputted by the video inputting device for a key image in each size changed in stages by the size changing device.

3. The video recording apparatus according to claim 1, comprising:
- a printing device for printing a frame of the video inputted by the video inputting device on a sheet of photographic paper, and
- a print control device for causing the printing device to print the frame detected by the key image detecting device.

4. The video recording apparatus according to claim 2, comprising:
- a printing device for printing a frame of the video inputted by the video inputting device on a sheet of photographic paper, and
- a print control device for causing the printing device to print the frame detected by the key image detecting device.

5. A video printing apparatus comprising:
a video inputting device for inputting a video;
a printing device for printing a frame of a video inputted by the video inputting device on a sheet of photographic paper;
a portrait inputting device for inputting a portrait;
a key image extracting device for extracting a person's face image as a key image from the portrait inputted by the portrait inputting device;
a key image detecting device for detecting a frame containing a key image extracted by the key image extracting device in a video inputted by the video inputting device; and
a print control device for causing the printing device to print a frame detected by the key image detecting device.

6. The video printing apparatus according to claim 5, comprising a size changing device for changing a size of the key image in stages,
wherein the key image detecting device detects a frame containing a key image in a video inputted by the video inputting device for a key image in each size changed in stages by the size changing device.

* * * * *